Dec. 13, 1960  V. J. FANTOZZI ET AL  2,963,926
METHOD OF AND FIXTURE FOR MOUNTING ABRASIVE
SEGMENTS ON SAW BLADES
Filed Jan. 12, 1960  2 Sheets-Sheet 1
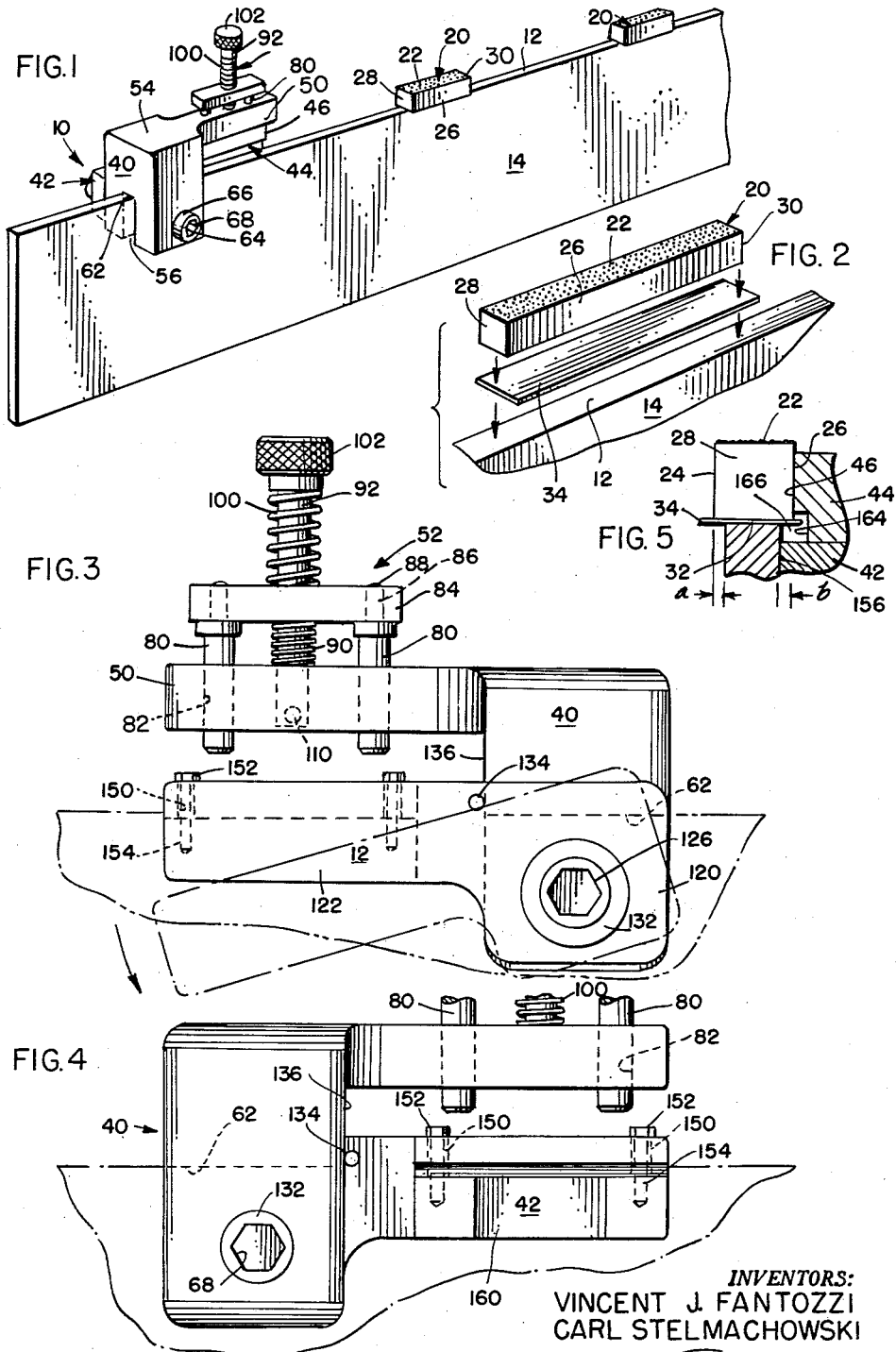
INVENTORS:
VINCENT J. FANTOZZI
CARL STELMACHOWSKI
BY
ATT'Y

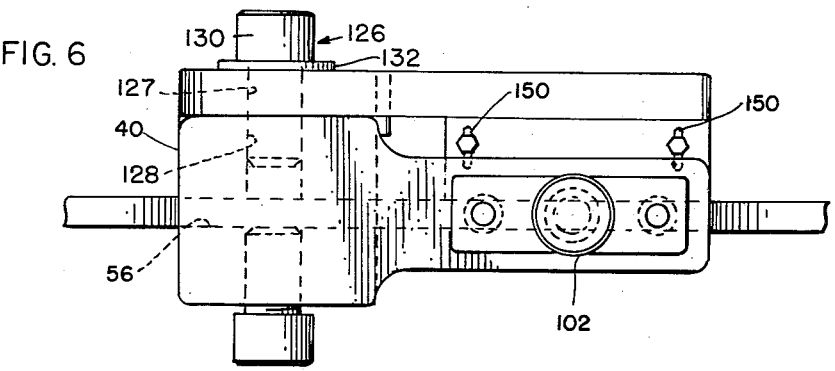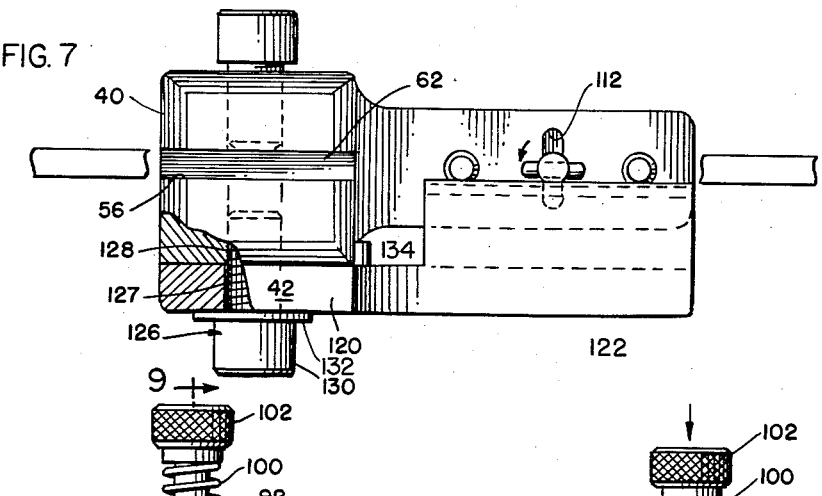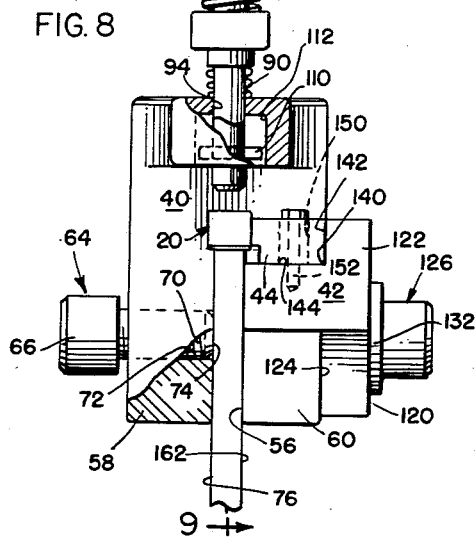

United States Patent Office 2,963,926
Patented Dec. 13, 1960

2,963,926

METHOD OF AND FIXTURE FOR MOUNTING ABRASIVE SEGMENTS ON SAW BLADES

Vincent J. Fantozzi, Park Ridge, and Carl Stelmachowski, Chicago, Ill., assignors to Super-Cut, Inc., Chicago, Ill., a corporation of Illinois Filed Jan. 12, 1960, Ser. No. 2,070

19 Claims. (Cl. 76—112)

The present invention relates to fixtures for mounting abrasive saw teeth on saw bodies and has particular reference to a novel method and fixture by means of which abrasive saw tooth elements, commonly referred to as segments, together with strips of silver solder, are held in position on the working edge of a saw blade preparatory to and during the application of heat to the solder so that upon melting of the solder the segments will become permanently affixed to the blade in their proper operative working relationship.

The improved fixture of the present invention has been designed for use, and it has been illustrated and described herein, in connection with the application of abrasive segments to the straight linear edge of a flat reciprocable gang saw blade. The fixture is, however, susceptible to modification and the same may, if desired, with or without modification, be employed for applying abrasive segments to the circular edges of rotary saw blades. Irrespective, however, of the particular use to which the invention may be put, the essential features thereof are at all times preserved.

Heretofore, the proper application of abrasive segments to the working edges of gang saw blades has been accomplished only by the efforts of highly skilled workmen who, in installing the segments so that they equally overhang the lateral sides of the blade, must exercise gerat care and exhibit a high degree of skill during the initial mounting of each segment on the blade, as well as during the application of heat to the solder so that as the solder melts and flows into its bonding relationship relative to the segment and blade edge, the segment will settle into the exact desired position of orientation relative to the blade edge and remain in such position during the brief interval during which the heated solder becomes hardened.

Not only is a high degree of skill required for the installation of new or unused full-size abrasive segments, but an even higher degree of skill must be exercised when applying partially worn segments to a gang saw blade. Gang saw machines or assemblies are relatively massive and the blades associated therewith are large. Such saws are frequently employed for sawing slabs from large blocks of marble, granite, concrete or other materials, either natural or synthetic, and when put to such use, they are conveniently mounted as superstructures over railway flat cars carrying the material to be thus divided into slabs. During reciprocation of the blades, the centrally disposed abrasive segments are subjected to more prolonged contact with the material undergoing sawing than are the segments in the end regions of the blades and, consequently, these medial segments wear faster than do the others. Where the segments are in the form of matrices containing diamond grains or particles, the cost thereof is high and it has been found expedient to transfer partially worn segments from a used blade to a new blade, or to rearrange the disposition of segments on the same or on different blades in order to effect a satisfactory overall equal wear of the segments during any given operation or series of operations. Because of the fact that worn abrasive segments undergo a decrease in height and, to a certain extent, in width, their proper application to the saw blade edge creates special problems which are individual to the installation of each segment. It is these things which tax the judgment and skill of the operator.

The present invention is designed to overcome the above noted limitations that are attendant upon the installation of abrasive segments, especially segments of the diamond impregnated matrix type, and, toward this end, the invention contemplates the provision of a novel form of fixture by means of which any given segment, together with a small quantity of silver solder, may be applied to the working edge of a gang saw or similar blade in approximately its operative working position and firmly held in such position preparatory to the application of heat to the solder. The fixture is so designed that upon such application of heat and consequent melting of the solder, the segment is automatically displaced throughout a small increment of motion incident to release thereof by the molten solder and, during such release and displacement of the segment, the same is positively guided to its final operative position on the blade edge and firmly held in such position during the brief interval of time consumed for solidification of the solder and consequent permanent bonding of the abrasive segment in place.

The provision of a fixture of the character briefly outlined above being among the principal objects of the present invention, it is a further object to provide such a fixture having associated therewith means whereby limited adjustment of certain parts thereof may be effected to accommodate its use in connection with undersize or used segments.

Yet another object of the invention, in a fixture of this character, is to provide a yielding lost motion connection between the actual clamping element of the fixture and the abrasive segment so that upon the application of heat with consequent solder flow, any tendency for slack to take place between the clamping element and segment will immediately and automatically be taken up and the segment forced to its final or home position on the edge of the saw blade.

A still further object of the invention is to provide a fixture which, after an initial setting of the abrasive segment and solder on the blade edge, requires no further care or attention on the part of the operator other than that required in guiding the flame-producing torch so that the flame will properly encompass the localized region where the union is to be made.

Another object of the invention is to provide a fixture for applying abrasive segments to a saw blade wherein all of the operative parts of the fixture are self-contained so that there will be little likelihood of misplacement or loss of parts.

The provision of a fixture which is relatively simple in its construction and which, therefore, may be manufactured at a relatively low cost; one which is comprised of a minimum number of parts, particularly moving parts, and which, therefore, is unlikely to get out of order; one which is rugged and durable and which, therefore, will withstand rough usage; one which requires no particular degree of skill for its operation; one which is compact in its assembly; and one which, otherwise, is well adapted to perform the services required of it are further desirable features which have been borne in mind in the production and development of the present invention.

Other objects and advantages of the invention, not at this time enumerated, will become readily apparent as the following description ensues.

In the accompanying two sheets of drawings forming a part of this specification, one illustrative embodiment of the invention has been shown.

In these drawings:

Fig. 1 is a fragmentary perspective view of a portion of a gang saw blade showing the improved fixture of the present invention operatively applied thereto and in the process of mounting an abrasive segment on the working edge of a gang saw blade;

Fig. 2 is an enlarged exploded perspective view of a portion of the blade edge illustrating the disposition of an abrasive segment and a strip of silver solder by means of which the segment is bonded to the blade edge immediately preparatory to assembly of the parts;

Fig. 3 is a front elevational view of the fixture showing its relationship to the saw blade from the operator's side of the blade during application of the segment;

Fig. 4 is a rear elevational view of the structure shown in Fig. 3;

Fig. 5 is an enlarged sectional view taken substantially along the line 5—5 of Fig. 9;

Fig. 6 is a top plan view of the structure shown in Fig. 3;

Fig. 7 is a bottom plan view of the structure shown in Fig. 3;

Fig. 8 is an end elevational view of the fixture with certain parts broken away to more clearly reveal the nature of the invention; and Fig. 9 is a sectional view taken substantially along the line 9—9 of Fig. 8 but with the parts in a different condition.

Referring now to the drawings in detail and in particular to Fig. 1, a fixture constructed in accordance with the principles of the present invention has been designated in its entirety at 10 and it is shown as being operatively applied to the working edge 12 of a gang saw blade, a portion of which has been shown fragmentarily at 14. The blade 14 is in the form of an elongated steel plate having a series of spaced abrasive segments or teeth 20 applied to the working edge thereof. Normally, in use, the working edge 12 of the blade 14 faces downwardly so that upon reciprocation of the blade endwise the abrasive segments will be drawn over the face of the work therebeneath. However, the blade 14 shown herein is disposed with the working edge 12 thereof facing upwardly to facilitate use of the fixture and application of the segments thereto.

The abrasive segments 20 are in the form of generally rectangular bodies or blocks which may be approximately square in transverse cross section and which are of a width slightly greater than the thickness of the saw blade 14 so that when the bodies are operatively applied to the working edge 12, they will slightly overhang the working edge on opposite sides thereof as shown diagrammatically at a and b in Fig. 5.

Each segment 20 is comprised of abrasive particles, preferably diamond particles or granules, encased in a suitable matrix. Each segment has an upper working face 22, elongated side faces 24 and 26, respectively, end faces 28 and 30, respectively, and a bottom or inner face 32, this latter face being designed for application to the working edge 12 of the blade 14 by a soldering operation as will be made clear presently.

In the application of the individual segments 20 to the working face 12 of the blade, either in the conventional manner by hand operation or by utilizing the fixture 10 according to the present invention, a strip of silver solder, such as has been shown at 34 in Fig. 5, is placed upon the upwardly facing working edge 12 of the blade 14 after which the segment 20 is placed upon the strip of solder 34. While maintaining the parts in this position, heat is applied to the region of application, preferably by directing the flame issuing from a blow torch or the like against the working area so that the solder strip 34 will melt and flow while at the same time the segment will seat upon the edge 12 in its final position of installation and remain seated while the solder hardens. Heretofore, when employing such manual operations, it has been necessary for the operator initially to gauge the position of the segment on the blade edge by eye in an effort to obtain equal overhang on both sides of the blade. During the melting of the solder, it has been necessary for the operator to manipulate the torch with one hand and to stabilize the segment by applying pressure thereto, utilizing a suitable instrument such as a short length of rod stock or a pliers, so that the segment may be floated, so to speak, on the molten solder to its final home position on the blade edge. The change for misalignment of the segment relative to the blade edge is thus two-fold and, furthermore, the procedure is exacting and time-consuming.

The fixture 10 of the present invention obviates the procedure outlined above and, briefly, the fixture involves in its general organization a saddle member 40 adapted to be positioned over the edge of the saw blade 14 in the vicinity of the region where the segment is to be applied, together with clamping means for securely and fixedly clamping the saddle member in position on the blade. Pivoted to the saddle member for swinging movement between a lowered inoperative position and a raised operative position is a gauge arm 42 having a gauge block proper 44 associated therewith. In its raised position, the gauge block presents a flat gauge surface 46 (Fig. 5) which is offset from the median plane of the saw blade a distance equal to one-half the thickness of the saw blade plus the extent of overhang of the blade on the side thereof adjacent the surface 46. When the gauge arm 44 is in its raised position, it is disposed slightly above the level of the saw blade edge 12 so that the segment 20, together with the strip of silver solder 34, may be operatively positioned on the blade edge 12 and pushed against the gauge surface 46, at which time the segment will assume its correct position on the blade edge 12 or nearly so. The gauge block 44 is adjustable within small limits on the gauge arm so that its position may be shifted toward and away from the medial plane of the saw blade to accommodate the installation of segments 20 or varying width while at the same time preserving equality of overhang on both sides of the blade edge 12.

Means are provided for clamping the gauge arm in its raised operative position so that the operator will have both hands free for initial application of the segment and strip of solder to the blade edge, as well as for subsequent operations.

The saddle member 40 is provided with a reaction arm 50 which, when the saddle member is in its operative position on the blade edge 12, overlies the region of the blade edge where actual installation of the segment is to be made. This reaction arm is in the form of a lateral extension of the saddle member and it has associated therewith a yieldable lost motion clamping device or assembly 52, which is manually operable at will to yieldingly but firmly apply downward pressure to the segment and solder strip 34 which have loosely been positioned on the blade edge 12, as previously described, so that these elements will not become dislodged during final installation operations.

With the clamping assembly 52 operatively engaging the segment, and with the latter in position above the solder strip 34 on the blade edge, the flame is applied to the region of installation to melt the solder. During this procedure, the clamping assembly will yieldingly and automatically force the segment downwardly through the molten solder and cause the same to seat accurately in its final position on the blade edge 12 and maintain the same in such final position after the flame has been withdrawn and until the solder has solidified.

Thereafter, the saddle member may be removed from the blade edge by loosening the clamping means therefor so that the entire fixture may be withdrawn bodily as a unit and readjusted for application to the blade edge at a different location for installation of the next succeeding segment 20 on the edge.

The saddle member 40 is provided with a main body portion 54 in the form of a generally rectangular block of metal and from one side of which the reaction arm 50 extends laterally. The lower region of the body portion 54 is split or slotted as at 56 to provide a pair of side legs 58 and 60, respectively, which are adapted to straddle the blade edge 12 when the saddle member is in position on the saw blade 14. The bottom face 62 of the slot 56 is flat and it is adapted to become inverted and seat squarely upon the blade edge 12 when the saddle member 40 is in position on the saw blade 14. The width of the slot 56 is approximately equal to the thickness of the saw blade 14 so that the saddle member will seat over the blade edge with a fairly snug fit.

The clamping means for fixedly securing the saddle member 40 in its seated position on the saw blade is in the form of a locking screw 64 which may be of the Allen head type, the head portion 66 thereof being formed with an hexagonal socket 68 therein designed for reception of an Allen wrench or similar tool. The shank 70 of the locking screw 64 is threadedly received in a bore 72 provided through the leg 58 and the distal end 74 of the shank is adapted to engage one side 76 of the saw blade 14 when the locking screw 64 is tightened as clearly shown in Fig. 8.

The clamping assembly 52 for yieldingly maintaining the segment 20 and solder strip 34 in position on the saw blade edge 12 comprises a pair of spaced parallel vertically extending plungers 80 which are vertically slidable in bores 82 provided in the reaction arm 50. The plungers 80 project completely through the bores 82 and the upper ends thereof are connected together by means of a crosshead 84. The plungers 80 are preferably, but not necessarily, rotatable relative to the crosshead 84 in that the upper ends of the plungers 80 are reduced as at 86 and the reduced portions are loosely riveted as at 88 over the rims of respective bores 89 through which the reduced portions 86 extend.

The plungers 80 are normally maintained in elevated retracted positions under the influence of a coil spring 90 as shown in Figs. 3 and 8. The coil spring 90 surrounds an actuating rod 92, the lower regions of which extend slidably through a vertical guide bore 94 (Fig. 9) provided in the reaction arm 50 and the medial regions of which extend slidably through a vertical bore 96 provided in the crosshead 84. The spring 90 bears at its lower end against the upper face of the reaction arm 50 while the upper end of the spring bears against the lower face of the crosshead 84. A second coil spring 100 surrounds the rod 92 and bears at its upper end against an enlarged knurled manipulating head 102 formed on the upper end of the rod. The lower end of the spring 100 bears against the upper face of the crosshead 84.

In the normal position of the parts, the spring 100 is only lightly compressed between the knurled head while the spring 90 is more effectively compressed between the crosshead 84 and reaction arm 50 so that normally the crosshead is maintained in the raised retracted position wherein it is shown in Fig. 8. In this fully raised position, the crosshead 84, and consequently, the plungers 80 which are movable bodily therewith, are supported between the two springs 90 and 100 in a state of equilibrium with both springs pushing against the crosshead 84 and the latter being capable of yielding movement either upwards or downwards against the yielding action of the springs 100 and 90, respectively. The actuating rod 92, however, is maintained in the uppermost position of which it is capable of assuming by means of a crosspin 110 which is receivable in a relatively deep elongated transversely extending socket 112 (Figs. 7, 8 and 9) formed in the underneath side of the reaction arm 50. The socket 112 intersects the bore 94 and provides, in effect, a pair of diametrically opposed bayonet slots designed for cooperation with the crosspin 110. The width of the socket 112 is slightly greater than the diameter of the crosspin 110 so that the latter may readily enter the socket 112 when the actuating rod 92 is turned so that the pin and socket are in the proper angular relationship or position of approximate register. When in such register, the force of the spring 90 will serve to urge the crosshead 84 upwardly so that the latter will operate through the spring 100 to urge the head 102, and, consequently, the rod 92 upwardly and cause the crosspin 110 to seat on the bottom of the elongated transversely extending socket 112.

When the strip of solder 34 and segment 20 are in position on the edge 12 of the saw blade 14, as shown in Fig. 9, these parts may be securely clamped in position by causing the plungers 80 to descend and yieldingly bear against the upper face 22 of the segment. This may be accomplished by manually depressing the rod 92 through the medium of the knurled head 102 until the lower ends 114 of the plungers 80 engage the surface 22, after which the downward motion of the plungers will be arrested while the crosshead 84 continues its downward motion, thus causing the spring 100 to be compressed between the upper face of the crosshead 84 and the knurled head 102. The compressional force of the spring 100 which will thus be applied to the crosshead and plungers until such time as the crosspin 110 emerges from the elongated transversely extending slot 112, after which a turning of the knurled head 102 through an angle of approximately 90° will cause the crosspin 110 to move out of angular register with the slot 112. Upon manual release of the knurled head 102, the various parts will assume the position shown in Fig. 9 wherein the crosspin 110 is caused yieldingly to bear against the underneath face of the reaction arm 50 while the plungers 80 are left in yielding contact with the upper face 22 of the segment 20. The segment 20 and the strip of solder 34 therebeneath are firmly clamped in their operative position on the saw blade edge 12.

At this point in the process of installing the segment 20 on the edge 12 of the saw blade 14, the gauge arm 42 by means of which the solder strip 34 and segment initially were positioned on the edge 12 in their proper relationship, is swung to a lowered inoperative out-of-the-way position in a manner that will be made clear presently, so that the entire region of installation is accessible for application thereto of a flame for solder melting purposes.

The gauge arm 42 is best seen in Figs. 3, 7 and 8. This arm has an enlarged proximate end 120 which merges with a reduced distal end 122. The proximate end 120 of the arm is mounted for swinging movement in a vertical plane on the outside face 124 of the leg 60 of the saddle member 40 by means of a clamping bolt 126 which passes through a bore 127 provided in the arm 42 and which is threadedly received in a socket 128 provided in the leg 60. The bolt 126 may be of the Allen head type and it is provided with an enlarged head 130 beneath which there seats a clamping washer 132. By loosening the bolt 126, the gauge arm 42 in its entirety is capable of swinging movement about the axis of the bolt from the full line operative raised position wherein it is shown in Fig. 3 through the intermediate dotted line position thereof to an inoperative lowered position wherein it extends substantially vertically and wherein it is in an out-of-the-way position to permit application of a flame to the solder strip 34 as previously described. The operative position of the gauge arm 42 is determined by the provision of a limit stop finger 134 which extends laterally from one face of the arm and is designed for engagement with one end face 136 of the saddle member 40.

As best seen in Fig. 8, the distal end region 122 of the gauge arm 42 is formed with a rectangular recess 140 having a vertical side surface 142 and a horizontal flat bottom surface seat 144. Within this recess 140 there is seated the previously mentioned gauge block 44. The gauge block 44 is capable of limited shifting movement or adjustment toward and away from the vertical side surface 142 to accommodate installation of segments 20 of varying widths.

Adjustment of the gauge block 44 is made possible by the provision of a pair of elongated transversely extending spaced slots 150 (Figs. 3, 4, 6 and 8) which extend vertically through the block and through which there extend a pair of clamping screws 152. The lower ends of the clamping screws 152 are threadedly received as at 154 in the upper face of the distal end region 122 of the gauge arm 42. By loosening the screws 152, the block 42 is released for adjustment purposes, after which the screws may again be tightened to lock the block in any desired position of adjustment.

Referring now to Figs. 4 and 5, it will be observed that the inside face 156 of the gauge arm 42 is relieved along a medial area thereof to provide a shallow depression 160 which affords raised end regions in the face designed to seat squarely on the side 162 of the saw blade 14 when the gauge arm 42 is in its elevated operative gauging position and when the clamping bolt 126 is tightened.

The lower region of the working face 46 of the gauge block 44 is cut back as at 164 to provide a clearance void 166 into which one edge of the solder strip 34 may extend, as clearly shown in Fig. 5, when the gauge arm 42 is initially raised to its operative position after the solder and segment have previously been positioned on the saw blade edge 12 in the manner previously described.

From the above description, it is thought that the nature and operation of the herein described fixture and the method involved in its use will be readily understood without further explanation. However, by way of explanation, it is pointed out that since both the strip 34 of silver solder and the abrasive segment 20 are applied against the working face 46 of the adjustable gauge block 44 after the gauge arm 42 has been raised to its operative gauging position and clamped in position by tightening the clamping bolt 126, the solder strip 34 may be moved into the position shown in Fig. 5 with no interference of parts. After the knurled head 102 of the actuating rod 92 has been manipulated to force the plungers 80 against the upper face 22 of the segment 20 and yieldingly maintain these plungers against the segment, the clamping bolt 126 may be loosened and the gauge arm dropped to its lowermost inoperative out-of-the-way position without appreciable interference between the working face 46 of the gauge block and the extreme inside edge of the solder strip 34 inasmuch as loosening of the bolt 126 will afford a certain amount of looseness of the arm 42 while the inherent flexibility of the solder strip 34 will allow the working face 46 to brush past, so to speak, the edge of the strip 34 during lowering of the gauge arm 42. With the gauge arm 42 in its lowered position, ample working room is afforded for application of a flame to both sides of the segment and solder strip, utilizing either a single flame-producing torch or a dual torch unit having oppositely and inwardly directed flame jets.

The invention is not to be limited to the exact arrangement of parts shown in the accompanying drawings or described in this specification since various changes in the details of construction may be resorted to without departing from the spirit of the invention. For example, while the saddle member 40 illustrated and described herein has been slotted as at 56 to accommodate the application of the fixture to the linearly straight edge 12 of a gang saw blade 14, it is within the scope of the present invention to utilize the fixture in the application of abrasive segments to the curved or circular edges of rotary saw blades. To accommodate such an application, it is obvious that the character of the bottom of the slot 56 would be modified to fit the curvature of the saw blade edge, or suitable seating pins or shoulders would be created internally of the slot for effective seating engagement with the spaced regions on the curved edge of the saw blade. Irrespective of such modifications in the details of construction, the essential features of the invention will at all times be preserved. Therefore, only insofar as the invention has specifically been pointed out in the accompanying claims is the same to be limited.

Having thus described the invention what we claim as new and desire to secure by Letters Patent is:

1. A fixture for mounting abrasive segments on the working edge of a saw blade, said fixture comprising a saddle member adapted to straddle said working edge in the vicinity of a selected region of the edge to which an abrasive segment is to be applied, means for removably but fixedly clamping said saddle member in operative position on said blade in its straddling relationship with respect to the edge, a reaction arm on said saddle member adapted to overlie said selected region in spaced relation thereto, clamping means carried by said reaction arm and having a clamping element movable in the general plane of the blade toward and away from said working edge and designed for yielding clamping engagement with an abrasive segment loosely positioned on the edge, and spring means for urging said clamping element toward said working edge and into such yielding engagement with the abrasive segment.

2. A fixture for mounting abrasive segments on the upwardly facing working edge of a saw blade, said fixture comprising a saddle member adapted to straddle said working edge in the vicinity of a selected region of the edge to which the abrasive segment is to be applied, means for removably but fixedly clamping said saddle member in operative position on the blade in its straddling relationship with respect to the edge, a reaction arm on said saddle member adapted to overlie said selected region in spaced relation thereto, a plunger slidable on said reaction arm in the general plane of the saw blade and movable between a retracted position wherein it is out of engagement with an abrasive segment loosely positioned on the working edge and an advanced position wherein its lower end engages said segment, spring means normally urging said plunger to its retracted position, and manually operable spring means, operable at will, for yieldingly urging said plunger toward its advanced position against the action of said first mentioned spring means.

3. A fixture for mounting abrasive segments on the working edge of a saw blade, said fixture comprising a saddle member adapted to straddle said working edge in the vicinity of a selected region of the edge to which the abrasive segment is to be applied, means for removably but fixedly clamping said saddle member in operative position on the blade in its straddling relationship with respect to the edge, a reaction arm on said saddle member adapted to overlie said selected region in spaced relationship thereto, said reaction arm being formed with a pair of spaced vertical bores therethrough in vertical register with said working edge, a pair of plungers slidably disposed in said bores and projecting completely therethrough, a crosshead movable bodily with and connecting said plungers above said reaction arm and movable between a lowered position wherein the lower ends of the plungers engage an abrasive segment loosely disposed on said working edge and a raised position wherein the lower ends of the plunger are out of engagement with the segment, an actuating rod slidable through said crosshead and movable vertically relative thereto between a lowered advanced position and a raised retracted position, said actuating rod being provided with a downwardly facing shoulder, a spring interposed between the shoulder and the crosshead and serving normally to maintain the rod in its retracted position, a second spring interposed between the reaction arm and the crosshead and serving to maintain the crosshead and plungers in their raised position, and releasably interlocking means on said actuating rod and reacting arm for locking the rod in its lowered advanced position.

4. A fixture for mounting abrasive segments on the working edge of a saw blade, said fixture comprising a saddle member adapted to straddle said working edge in the vicinity of a selected region of the edge to which the abrasive element is to be applied, means for removably but fixedly clamping said saddle member in operative position on the blade in its straddling relationship with respect to the edge, a reaction arm on said saddle member adapted to overlie said selected region in spaced relation thereto, said reaction arm being formed with a pair of spaced vertical bores therethrough in vertical register with said working edge, a pair of plungers slidably disposed in said bores and projecting completely therethrough, a crosshead movable bodily with and connecting said plungers above the reaction arm and movable between a lowered position wherein the lower ends of the plungers engage an abrasive segment loosely disposed on said working edge and a raised position wherein the lower ends of the plungers are out of engagement with the segment, an actuating rod slidable through and movable vertically relative to the crosshead between advanced and retracted positions respectively, first spring means normally urging said crosshead toward its raised position, second spring means interposed between the actuating rod and crosshead and effective against the latter to move the same bodily with the former toward its lowered position against the action of said first spring means when the rod is moved to its advanced position, and releasable interlocking means on said actuating rod and reaction arm respectively for locking said rod in its advanced position.

5. A fixture for mounting abrasive segments on the working edge of a saw blade as set forth in claim 4 wherein said releasable locking means on said actuating rod and reaction arm comprises a bayonet pin and slot connection.

6. A fixture for mounting abrasive segments on the working edge of a saw blade as set forth in claim 4 wherein said spring means comprise compression springs surrounding said rod and interposed between the crosshead and a shoulder on the rod, and between the reaction arm and crosshead respectively.

7. A fixture for mounting abrasive segments on the working edge of a saw blade, said fixture comprising a saddle member adapted to straddle said working edge in the vicinity of a selected region of the edge to which the abrasive segment is to be applied, means for removably but fixedly clamping said saddle member in operative position on the blade in its straddling relationship with respect to the edge, a reaction arm on said saddle member adapted to overlie said selected region in spaced relation thereto, said reaction arm being formed with a pair of spaced vertical bores therethrough in vertical register with said working edge, a pair of plungers slidably disposed in said bores and projecting completely therethrough, a crosshead movable bodily with and connecting said plungers above the reaction arm and movable between a lowered position wherein the lower ends of the plungers engage an abrasive segment loosely disposed on said working edge and a raised position wherein the lower ends of the plungers are out of engagement with the segment, a rotatable actuating rod slidable through and movable vertically relative to the crosshead between advanced and retracted positions respectively, said reaction arm being formed with a vertical bore therein and a downwardly facing socket in communication with the bore and establishing a bayonet slot in the side wall of the bore, said rod also projecting into said bore and being slidable therethrough, a first spring surrounding the rod and interposed between said reaction arm and crosshead for normally urging the crosshead toward its raised position, a second spring surrounding the rod and interposed between a shoulder on the rod and the crosshead and normally urging the rod to its retracted position, and a crosspin on said rod movable into and out of said downwardly facing socket for selectively maintaining said rod in its advanced and retracted positions respectively.

8. A fixture for mounting abrasive segments on the working edge of a saw blade as set forth in claim 7 wherein said plungers are individually rotatable on the crosshead about their respective vertical axes.

9. A fixture for mounting abrasive segments on the working edge of a saw blade, said fixture comprising a saddle member adapted to straddle said working edge in the vicinity of a selected region of the edge to which the abrasive segment is to be applied, means for removably but fixedly clamping said saddle member in operative position on the blade in its straddling relationship with respect to the edge, a reaction arm on said saddle member adapted to overlie said selected region in spaced relation thereto, said reaction arm being formed with a pair of spaced vertical bores therethrough in vertical register with said working edge, a pair of plungers slidably disposed in said bores and projecting completely therethrough, a crosshead movable bodily with and connecting said plungers above the reaction arm and movable between a lowered position wherein the lower ends of the plungers engage an abrasive segment loosely disposed on said working edge and a raised position wherein the lower ends of the plungers are out of engagement with the segment, an actuating rod slidable through and movable vertically relative to the crosshead between advanced and retracted positions respectively, first spring means normally urging said crosshead toward its raised position, second spring means interposed between the actuating rod and crosshead and effective against the latter to move the same bodily with the former toward its lowered position against the action of said first spring means when the rod is moved toward its advanced position, releasable interlocking means on said rod and reaction arm respectively for locking the rod in its advanced position, and a gauge member having a gauge surface thereon and movably mounted on said saddle member for movement between an operative position wherein it is in register with said selected region of the blade edge for segment-gauging purposes and an inoperative out-of-the-way position.

10. A fixture for mounting abrasive segments on the working edge of a saw blade as set forth in claim 9 wherein said gauge member is in the form of an arm pivoted to the saddle member for swinging movement about a horizontal axis.

11. A fixture for mounting an abrasive segment in a predetermined position on the upwardly facing working edge of a saw blade, said fixture comprising a saddle member adapted to straddle said edge in the vicinity of a selected region of the edge to which an abrasive segment is to be applied, means for removably but fixedly clamping said saddle member in operative position on said blade in its edge-straddling relationship, a gauge member having a gauge surface thereon designed for contact with a surface on an abrasive segment to establish said predetermined position thereof, said gauge member being mounted on said saddle member for movement between an advanced position wherein said gauge surface is in its operative gauging position in register with said selected region and an inoperative out-of-the-way position wherein the gauge surface is remote from the region, and means for releasably clamping said gauge member in its operative position.

12. A fixture for mounting an abrasive segment in a predetermined position on the upwardly facing working edge of a saw blade as set forth in claim 11 wherein said gauge member is in the form of an arm having its distal end pivoted to the saddle member and having said gauge surface disposed at its distal free end.

13. A fixture for mounting an abrasive segment in a predetermined position on the upwardly facing working edge of a saw blade, said fixture comprising a saddle member adapted to straddle said edge in the vicinity of a selected region of the edge to which an abrasive segment is to be applied, means for removably but fixedly clamping said saddle member in its operative edge-straddling position on said blade, a gauge member having a gauge surface thereon designed for contact with a surface on an abrasive segment to establish said predetermined position thereof, said gauge member being mounted on said saddle member for movement between an advanced position wherein said gauge surface is in its operative gauging position in register with said selected region and an inoperative position wherein the gauge surface is remote from said region, releasable means on said saddle member for yieldingly clamping a segment positioned on said working edge in the selected region thereof against dislodgment independently of said gauge surface, and means for releasably clamping said gauge member in its operative position.

14. A fixture for mounting an abrasive segment in a predetermined position on the upwardly facing working edge of a flat saw blade, said fixture comprising a saddle member adapted to straddle said edge in the vicinity of a selected region of the edge to which an abrasive segment is to be applied, said fixture when in operative position on said edge presenting two saddle legs and an intervening saddle seat, a clamping bolt threaded in one of said legs and engageable with a side of the saw blade for clamping the saddle member in its operative position, a gauge arm pivoted at one end thereof to the other saddle leg and having a gauge surface at its other end designed for contact with a surface on the segment to establish said predetermined position of the segment, said gauge arm being capable of swinging movement between a raised position wherein said gauge surface is in operative register with said selected region and a lowered position wherein said gauge surface is remote from said region, a combined pivot and clamping bolt extending through said gauge arm and threadedly received in said other saddle leg for clamping the gauge arm in its raised position, and releasable means on said saddle member for yieldingly clamping a segment positioned on said working edge in the selected region thereof against dislodgment independently of said gauge arm.

15. A fixture for mounting an abrasive segment in a predetermined position on the upwardly facing working edge of a saw blade as set forth in claim 14, including, additionally, interengaging limit stop means on said gauge arm and said other leg of the saddle member for establishing the raised position of the gauge arm.

16. A fixture for mounting an abrasive segment in a predetermined position on the upwardly facing working edge of a saw blade as set forth in claim 14, including, additionally, a gauge block movably mounted on said gauge arm for limited adjustment toward and away from the general plane of said saw blade and on which block said gauge surface is formed, and means for clamping said gauge block in any selected position of adjustment on the arm.

17. In a fixture of the character described for holding an abrasive segment in a superimposed approximate position of attachment to the upwardly facing working edge of a flat saw blade with a flat strip of solder interposed between the segment and edge, with the sides of the segment and the side edges of the solder strip both overhanging the flat marginal sides of the working edge, and for guiding said segment to its final position of attachment during the application of heat to said solder strip to melt the same, said fixture comprising a saddle member adapted to straddle said working edge in the vicinity of a selected region of the edge to which an abrasive segment is to be affixed, releasable means for clamping said saddle member in its edge-straddling position, a reaction arm adapted to overlie said edge when the saddle member is in its operative position, a segment-engaging plunger slidable vertically through said reaction arm and having its lower end engageable with the upper face of said segment when the latter is in its approximate position of attachment, spring means operable at will for biasing said plunger downwardly into its segment-engaging position, a gauge arm movably mounted on said saddle member having a gauge surface thereon, said gauge arm being movable between an operative gauging position wherein said surface is in operative register with said selected region and a retracted position wherein the surface is remote from said region, said gauge surface being designed for engagement with one side of the segment at said selected region to establish the initial position of the latter, said gauge surface being formed with an elongated horizontal recess therein establishing a clearance region for an edge of the solder strip when the latter is interposed between the segment and working edge of the blade and releasable means for clamping said gauge arm in its advanced position.

18. A fixture of the character described and as set forth in claim 17, including, additionally, a gauge block movably mounted on said gauge arm for limited adjustment toward and away from the general plane of the saw blade, and means for releasably clamping said gauge block in any selected position of adjustment.

19. The method of mounting an abrasive segment on the upwardly facing working edge of a flat saw blade at a selected region along the edge with the lateral sides of the segment overhanging at least one marginal side of the blade, which comprises fixedly positioning a gauge element having a gauge surface thereon at one side of the blade in transverse register with said selected region and so that said gauge surface is spaced from the plane of said side of the blade a distance equal to the desired extent of overhang of the segment, loosely positioning a flat strip of solder on said working edge in the selected region and loosely superimposing the abrasive segment on the solder strip with a side edge of the segment engaging the gauge surface, yieldingly applying downward pressure to the upper face of the segment to clamp the segment and solder strip in position on said working edge against lateral dislodgment, removing said gauge element to afford a working clearance in the vicinity of said selected region, and applying heat to said solder to melt the same while maintaining said downward pressure on the upper face of the segment and solder therebeneath so that upon melting of the solder the segment will be forced vertically downwardly under the influence of said yielding pressure and caused to seat upon said working edge in a final position of mounting.

References Cited in the file of this patent

UNITED STATES PATENTS 2,755,760   Fermanan et al. _____ July 24, 1956